Oct. 27, 1925.

M. POSTEMSKY

PERMUTATION LOCKING MEANS FOR VALVES

Filed July 1, 1924

1,559,370

Inventor
M. Postemsky.

By

Attorney

Patented Oct. 27, 1925.

1,559,370

UNITED STATES PATENT OFFICE.

MICHAEL POSTEMSKY, OF BROOKLYN, NEW YORK.

PERMUTATION LOCKING MEANS FOR VALVES.

Application filed July 1, 1924. Serial No. 723,491.

*To all whom it may concern:*

Be it known that I, MICHAEL POSTEMSKY, a citizen of Poland, having taken out first papers preparatory to becoming an American citizen, residing at 207 Greene Street, Brooklyn, in the county of Kings and State of New York, have invented certain new and useful Improvements in Permutation Locking Means for Valves, of which the following is a specification.

This invention relates to an improvement in permutation locking means in combination with valve stems, wherein such stem is adapted for one or more rotations to open or close the valve.

The invention is particularly applicable in those situations, such for example, as in controlling the gasoline flow in an automobile, where the valve controlling such flow may be locked in closed position and unlocked only by an authorized person having a knowledge of the combination. The invention is to be distinguished from the ordinary application of a permutation lock to a member to be locked, as in adapting such lock for a valve stem, the lock must be arranged when open to permit continued and free rotation of the stem, and when locked to prevent such rotation. This requires a particular arrangement of the locking tumblers or elements, and the peculiar formation of the valve stem for cooperation with such elements, and it is with a view to providing this specific structure that the particular invention is designed.

Figure 1:
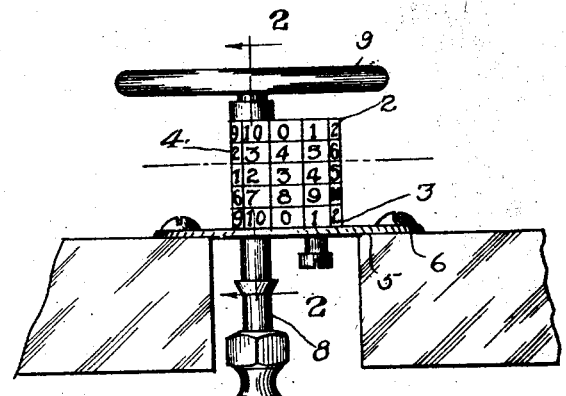
Fig. 1 is a view in elevation, showing the locking means combined with a rotatable valve stem.
Figure 2:
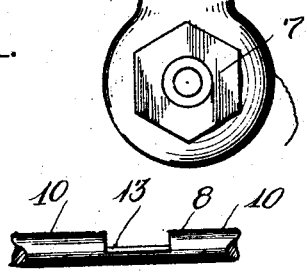
Fig. 2 is a plan of the stem, showing particularly the formation of the same within the range of the adjustable discs.
Figure 3:
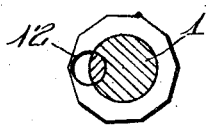
Figure 4:
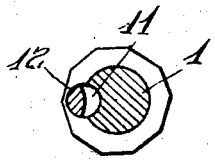
Figure 5:
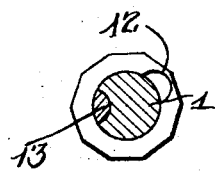

Figs. 3, 4, and 5, are sectional views showing the various relations of the disc and valve stem.

The improved locking means comprises a lock barrel 1, having a fixed disc 2 at one end, a similar fixed disc 3 at the opposite end, and a series of intermediate movable discs 4 arranged between the fixed discs. All discs have suitable character indications on their surfaces, adapted under predetermined arrangement to indicate an unlocked relation of the discs, as is common in locks of this character.

If desired, and in particular relation to its use for the control of a valve in automobile structures, the lower fixed disc of the barrel may be secured to a plate 5 which may project beyond the disc to permit securing of the plate and thereby the lock to an appropriate portion of the automobile as at 6 adjacent the valve to be locked. The valve to be controlled, say for example, a valve 7, for controlling the passage of gasoline from the tank to the carbureter, has the usual stem 8, which passes through the lock and is provided at its upper end with a convenient means as a wheel 9, whereby the valve may be operated. This valve stem is, in its passage through that portion of the lock including the fixed discs 2 and 3, circular in cross section, as at 10, and the lock, that is, the barrel 1 and fixed discs 2 and 3, are together formed with an opening 11 of a size and shape to permit free rotation of the valve stem. This opening 11 in the barrel and fixed discs is therefore circular in shape and is provided half in the barrel and half in the fixed discs. That portion of the opening 11 in the barrel is continued in that portion of the barrel receiving the movable discs, and the latter are formed at an appropriate point in their inner periphery with a semi-circular opening 12, which when in registry with the semi-circular recess in the barrel, provides a circular opening which accurately receives and permits rotation of the stem. Throughout that portion of the stem however, which coincides with the plane of the movable discs, the stem is cutaway at 13, the surface of the cutaway portion being such that when the normally rounded part of the stem within the cutaway area is in the recess 11 in the barrel 1, this lower surface of the cutaway portion forms a continuation of the outer surface of the barrel, as clearly shown in Fig. 3. Thus when the stem is turned to a position to cause that portion included in the cutaway area to be seated in the recess 11 of the barrel 1, the bottom surface of the cutaway portion 13 completes the contour of the barrel, and hence the movable discs are freely rotatable about the barrel and stem, and when rotated so that the recesses 12 in these movable discs are out of registry with the stem section as shown in Fig. 5, the stem cannot be turned, and is locked. Having set the movable discs in the relative order required by the combination, all recesses 12 in such movable discs are in registry with that portion of the valve stem within the recess 11, and there is thus provided a circular opening in the combined discs and barrel which permits free rotation of the valve stem, and hence the necessary movement of the same to open or close the valve 7.

While the invention is shown as particularly applied to valves, it is of course obvious that it is applicable for the control of any independently rotatable part, which in one position, is locked against such rotation, and in another position, is freely capable of such rotation.

Claims:

1. In combination with a rotatable valve stem, of a permutation lock, including movable discs and a barrel on which said discs are adapted for rotation, said discs and barrel together presenting an opening corresponding in size and shape to the normal transverse size and outline of the valve stem, said valve stem throughout the area of the movable discs being cutaway in part to permit free rotation of said discs when the valve stem is in a particular position relative to said discs.

2. In combination with a valve stem, a permutation lock comprising a barrel, and rotatable discs arranged on the barrel, said barrel having a peripheral recess corresponding to one-half the sectional area of the valve stem, said movable discs having an inner peripheral notch corresponding to approximately one-half the sectional area of said valve stem, the valve stem throughout the area of the movable discs being cutaway to present a surface forming a continuation of the normal surface of the barrel when the valve stem is seated in the barrel recess.

In testimony whereof I affix my signature.

MICHAEL POSTEMSKY.